ns Patent Office 2,837,514
Patented June 3, 1958

2,837,514

$\Delta^{8(9)}$-11-KETO-STEROIDS AND PROCESS OF PREPARING THEM

Earl M. Chamberlin, Westfield, N. J., assignor to Merck & Co., Inc., Rahway, N. J., a corporation of New Jersey No Drawing. Application December 26, 1951
Serial No. 263,473

19 Claims. (Cl. 260—239.55)

This invention is concerned generally with steroid compounds having an oxygen atom in the 11-position of the molecule and with processes for preparing these compounds. More particularly, it relates to novel 11-keto-cyclopentanopolyhydrophenanthrene compounds having a double bond connecting the carbon atoms in the 8 and 9-positions of the molecule, and with novel processes for preparing these $\Delta^{8(9)}$-11-keto-cyclopentanopolyhydrophenanthrene compounds from the epoxides of the corresponding $\Delta^{7(8),9(11)}$-cyclopentanopolyhydrophenanthrene compounds. The $\Delta^{8(9)}$-11-keto-cyclopentanopolyhydrophenanthrene compounds are valuable as intermediates in the synthesis of steroid hormones, having an oxygen atom attached to the 11-carbon atom, such as the adrenal hormones, corticosterone, cortisone and compound F.

I have discovered that these novel $\Delta^{8(9)}$-11-keto-cyclopentanopolyhydrophenanthrene compounds can be prepared by a direct, one-step process starting with the epoxide of the corresponding $\Delta^{7(8),9(11)}$-cyclopentanopolyhydrophenanthrene compound, by reacting said $\Delta^{7(8),9(11)}$ - cyclopentanopolyhydrophenanthrene epoxide (compound 1 hereinbelow) under substantially anhydrous conditions, with a polyvalent metal halide, whose halogen component has an atomic number below 40, and which can be characterized as a "Lewis Acid" in accordance with G. N. Lewis' definition of acids and bases as set forth on pages 80–81 of the text "Advanced Organic Chemistry" by G. B. Wheland (Wiley & Sons, 2nd edition, 1949). This reaction may be chemically represented (insofar as the changes taking place in rings B and C are concerned) as follows:

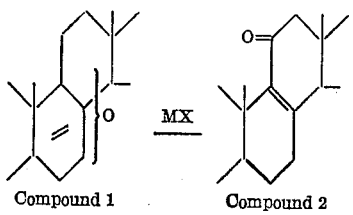

Compound 1    Compound 2 wherein M is a polyvalent metal, X is a halogen having an atomic number below 40, and MX can be characterized as a "Lewis acid."

The $\Delta^{7(8),9(11)}$ - cyclopentanopolyhydrophenanthrene epoxides which I ordinarily employ as starting materials in carrying out my process are those having a sterol side chain attached to the carbon atom in the 17-position of the molecule such as ergosteryl-D acetate epoxide, ergosteryl-D acylate epoxide, ergosterol-D epoxide, the epoxide of $\Delta^{7,9(11)}$-cholestadiene, the epoxide of $\Delta^{7,9(11)}$-3-acyloxy-cholestadiene, the epoxide of $\Delta^{7,9(11)}$-3-acetoxy-cholestadiene, the epoxide of $\Delta^{7,9(11),22}$-stigmastatriene, the epoxide of $\Delta^{7,9(11),22}$-3-ocyloxy-stigmastatriene, the epoxide of $\Delta^{7,9(11),22}$-3-acetoxy-stigmastatriene, a bile acid side chain attached to the 17-carbon atom such as the epoxide of $\Delta^{7,9(11)}$-3-hydroxy-choladienic acid, the epoxide of $\Delta^{7,9(11)}$-3-acyloxy-choladienic acid, the epoxide of $\Delta^{7,9(11)}$-3-acetoxy-choladienic acid, a degraded bile acid side chain attached to the 17-carbon atom such as the epoxide of $\Delta^{7,9(11)}$-3-hydroxy-bisnorallocholadienic acid, the epoxide of $\Delta^{7,9(11)}$-3-acyloxy-bisnorallocholadienic acid, the epoxide of $\Delta^{7,9(11)}$-3-acetoxy-bisnorallocholadienic acid, a 17-acetyl substituent such as the epoxide of $\Delta^{7,9(11)}$-3 - hydroxy - 20 - keto - allopregnadiene, the epoxide of $\Delta^{7,9(11)}$-3-acyloxy-20-keto-allopregnadiene, the epoxide of $\Delta^{7,9(11)}$-3-acetoxy-20-keto-allopregnadiene, a sapogenin side chain such as the epoxide of $\Delta^{7,9(11)}$-bisdehydrotigogenin, the epoxide of $\Delta^{7,9(11)}$-bisdehydrotigogenin-acylate, the epoxide of $\Delta^{7,9(11)}$-bisdehydrotigogenin-acetate, and the like.

In preparing these epoxides of $\Delta^{7,9(11)}$-cyclopentanopolyhydrophenanthrene compounds utilized as starting materials in my procedure, I ordinarily start with the corresponding $\Delta^{7,9(11)}$ - cyclopentanopolyhydrophenanthrene compounds, certain of which, such as ergosterol-D and 3-acyloxy derivatives thereof are described in the prior art. Other $\Delta^{7,9(11)}$-cyclopentanopolyhydrophenanthrene compounds can be prepared, starting with the readily available $\Delta^5$-cyclopentanopolyhydrophenanthrene compounds such as cholesterol, by treating said $\Delta^5$-cyclopentanopolyhydrophenanthrene compound (compound 3 hereinbelow) with N-bromosuccinimide, reacting the resulting $\Delta^{5}$-7-bromo-cyclopentanopolyhydrophenanthrene compound (compound 4) with a tertiary amine to form the corresponding $\Delta^{5,7}$ - cyclopentanopolyhydrophenanthrene compound (compound 5); reacting this compound with hydrogen in the presence of Raney nickel catalyst thereby selectively reducing the unsaturated ring attached to the carbon atom in the 5-position to form the corresponding $\Delta^7$-cyclopentanopolyhydrophenanthrene compound (compound 6) and bringing said $\Delta^7$-cyclopentanopolyhydrophenanthrene compound into intimate contact with a solution of mercuric acetate in acetic acid thereby producing the corresponding $\Delta^{7,9(11)}$-cyclopentanopolyhydrophenanthrene compound (compound 7). The reactions indicated hereinabove may be chemically represented (insofar as rings B and C are concerned) as follows:

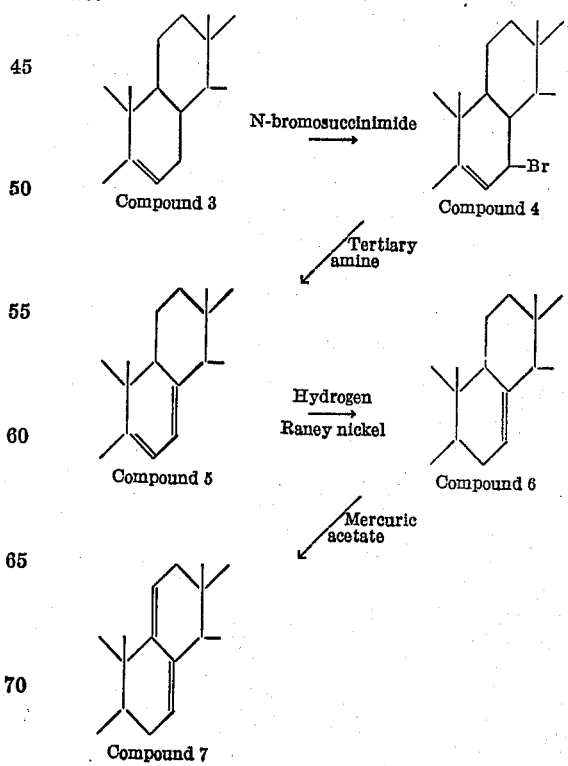

The $\Delta^{7,9(11)}$-cyclopentanopolyhydrophenanthrene compound thus obtained is then converted to the corresponding epoxide by reaction with perbenzoic acid. This reaction may be chemically represented (with respect to the chemical changes occurring in rings B and C) as follows:

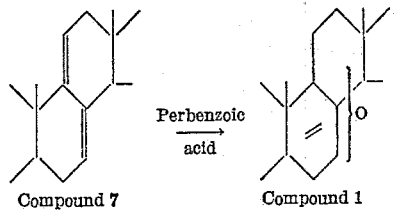

Compound 7   Compound 1

In accordance with my novel procedure, the epoxide of the $\Delta^{7,9(11)}$-cyclopentanopolyhydrophenanthrene compound is then reacted, under anhydrous conditions, with a polyvalent metal halide, which can be characterized as a "Lewis acid" as set forth in column 1 hereinabove and whose halogen component has an atomic number below 40, to produce the corresponding $\Delta^{8(9)}$-11-keto-cyclopentanopolyhydrophenanthrene compound.

The polyvalent metal halides which I ordinarily employ include the chlorides, bromides and fluorides of divalent copper, magnesium, zinc, boron, aluminum, tin, arsenic, antimony, bismuth, iron, cobalt and nickel, such as boron trifluoride, boron trichloride, boron tribromide, aluminum chloride, aluminum bromide, antimony tribromide, antimony trichloride, arsenic trichloride, arsenic tribromide, arsenic trifluoride, stannic chloride, stannic bromide, zinc chloride, zinc bromide, magnesium bromide, cupric bromide, cupric chloride, bismuth trichloride, bismuth tribromide, ferric chloride, ferric bromide, cobaltous chloride, cobaltous bromide, nickelous chloride, nickelous bromide, and the like. It will be noted that the expression "polyvalent metal" has been used to define the elements, antimony, arsenic, bismuth, and boron. Although it is possible that these elements, and particularly boron, may not be strictly classifiable as "metals," authority for including antimony, arsenic, bismuth and boron as examples within the scope of the generic term "polyvalent metal" in the present specification and claims appears on pages 66, 75, 129 and 139 of "Hackh's Chemical Dictionary" (third edition, The Blakiston Company, 1946 printing).

The reaction is carried out by suspending the epoxide of the $\Delta^{7,9(11)}$-cyclopentanopolyhydrophenanthrene compound in an anhydrous solvent, for example in a lower dialkyl ether such as diethyl ether, dibutyl ether, in an aromatic hydrocarbon such as benzene, toluene, and the like. The solvent utilized in the reaction must be substantially anhydrous and should be inert under the reaction conditions. I prefer to use boron trifluoride as the polyvalent metal halide, and to employ anhydrous diethyl ether as the solvent, since boron trifluoride is conveniently added in the form of its ether complex. The employment of substantially anhydrous conditions is important in order to avoid the formation of unwanted rearrangement side products.

The reaction between the epoxide of the $\Delta^{7,9(11)}$-cyclopentanopolyhydrophenanthrene compound and the polyvalent metal halide is ordinarily conducted at room temperature (about 25° C.), although temperatures up to about 35° C. may be used if desired. When the reaction is carried out at about 25° C., the time required for the reaction to be complete ranges from approximately one hour up to about three days. It is ordinarily preferred to carry out the reaction, where boron trifluoride is used as the polyvalent metal halide, at a temperature of about 25° C. for a period of about three days, whereby a maximum yield with minimum decomposition is achieved.

The amount of polyvalent metal halide utilized in the reaction with the epoxide of the $\Delta^{7,9(11)}$-cyclopentano- polyhydrophenanthrene compound can be varied from a 1:1 molar ratio of polyvalent metal halide to epoxide up to a large excess of the polyvalent metal halide reagent. It is ordinarily preferred to utilize a fifteenfold molar excess of boron trifluoride in order to shorten the reaction time and, at the same time, obtain a maximal yield of the corresponding $\Delta^{8(9)}$-11-keto-cyclopentanopolyhydrophenanthrene compound.

The $\Delta^{8(9)}$-11-keto-cyclopentanopolyhydrophenanthrene compounds obtained in accordance with my novel procedure include $\Delta^{8(9),22}$-11-keto-ergostadiene, $\Delta^{8(9),22}$-3-acyloxy-11-keto-ergostadiene, $\Delta^{8(9),22}$-3-acetoxy-11-keto-ergostadiene, $\Delta^{8(9),22}$-3-hydroxy-11-keto-ergostadiene, $\Delta^{8(9)}$-11-keto-cholestene, $\Delta^{8(9)}$-3-acyloxy-11-keto-cholestene, $\Delta^{8(9)}$-3-acetoxy-11-keto-cholestene, $\Delta^{8(9)}$-3-hydroxy-11-keto-cholestene, $\Delta^{8(9),22}$-3-hydroxy-11-keto-stigmastadiene, $\Delta^{8(9)}$-3-acyloxy-11-keto-cholenic acid, $\Delta^{8(9)}$-3-hydroxy-11-keto-cholenic acid, $\Delta^{8(9)}$-3-acetoxy-11-keto-cholenic acid, $\Delta^{8(9)}$-3-acyloxy-11-keto-bisnorallocholenic acid, $\Delta^{8(9)}$-3-acetoxy-11-keto-bisnorallocholenic acid, $\Delta^{8(9)}$-3-hydroxy-11-keto-bisnorallocholenic acid, $\Delta^{8(9)}$-3-acyloxy-11,20-diketo-allopregnene, $\Delta^{8(9)}$-3-acetoxy-11,20-diketo-allopregnene, $\Delta^{8(9)}$-3-hydroxy-11,20-diketo-allopregnene, $\Delta^{8(9)}$-11-keto-dehydrotigogenin acylate, $\Delta^{8(9)}$-11-keto-dehydrotigogenin-acetate, $\Delta^{8(9)}$-11-keto-dehydrotigogenin, $\Delta^{8(9),22}$-3-acyloxy-11-keto-stigmastadiene, $\Delta^{8(9),22}$-3-acetoxy-11-keto-stigmastadiene, and the like. These $\Delta^{8(9)}$-11-keto-cyclopentanopolyhydrophenanthrene compounds can be reduced with lithium in liquid ammonia to form the corresponding saturated 11-keto-steroid as described in a co-pending application of applicant's assignee, Serial No. 263,476, which was filed on December 26, 1951, the same date on which the instant application was filed. Thus, the $\Delta^{8(9),22}$-3-acetoxy-11-keto-ergostadiene defined by claim 16, as particularly described in Serial No. 263,476, is reduced by lithium in liquid ammonia to produce $\Delta^{22}$-ergostene-3$\beta$-ol-11-one. JACS 73, 2396 (May 1951), discloses the conversion of saturated 11-keto-steroids, such as $\Delta^{22}$-ergostene-3$\beta$-ol-11-one (i. e. saturated in the nucleus), to allopregnane-3$\beta$-ol-11,20-dione acetate; JACS 73, 4052 (August 1951), uses this compound to prepare allopregnane-3$\beta$,17$\alpha$,21-triol-11,20-dione 21-acetate; the conversion of the latter compound to cortisone acetate is set forth in Nature 168, page 28 (July 1951).

The following examples illustrate methods of carrying out the present invention, but it is to be understood that these examples are given for purposes of illustration and not of limitation.

*Example 1*

One gram of ergosteryl D-acetate epoxide was suspended in 100 ml. of anhydrous ether. Five milliliters of boron trifluoride (diethyl ether complex) was added to this suspension. All of the undissolved epoxide went into solution, and the resulting solution was allowed to stand at room temperature (25° C.) for a period of about three days.

The ethereal reaction mixture was extracted with a 25 cc. portion of water, then with a 25 cc. portion of a 2.5 N aqueous solution of sodium hydroxide, and finally with two 25 cc. portions of water. The washed ethereal solution was dried over anhydrous magnesium sulfate, filtered, and the ether evaporated therefrom on a steam bath. The residual material was dissolved in boiling methanol, the methanolic solution was allowed to stand at about 0° C., and the crystalline material which separated was filtered off and discarded.

The mother liquor and washings from the methanolic recrystallization were combined and the methanol evaporated therefrom on a steam bath. The residual material was dissolved in a 1:1 mixture of benzene and petroleum ether, and the resulting solution was chromatographed on a column containing 20 g. of acid-washed alumina. The resulting alumina adsorbate in the column was developed with the following solvents:

> Petroleum ether/benzene, 1:1
> Petroleum ether/benzene, 1:3
> Benzene
> Ether
> Methanol
> Ethyl acetate From the petroleum ether/benzene 1:1 eluate there was obtained a crystalline substance (M. P. 120–125° C. which, upon recrystallization from methanol, gave substantially pure $\Delta^{8,22}$ - 3 - acetoxy - 11 - keto - ergostadiene which melted at 131–133° C.; and which showed the characteristic ultra-violet absorption spectra for an $\alpha,\beta$-unsaturated ketone $\lambda_{max.}^{alcohol}$ 2540; E% 170, and which showed a specific rotation $\alpha_D^{24° C.} = +94.2°$ (in chloroform).

*Analysis.*—Calc'd for $C_{30}H_{46}O_3$: C, 79.24; H, 10.20. Found: C, 79.19; H, 10.31.

Example 2

Twelve and one-half grams of ergosteryl D-acetate epoxide were dissolved in 180 cc. of thiophene-free benzene, and to this solution was added 70 cc. of a diethyl ether solution containing 45% boron trifluoride. Moisture was prevented from entering the reaction vessel by means of a drying tube attached thereto. The solution containing the ergosteryl D-acetate epoxide and the boron trifluoride was allowed to stand at room temperature for about one hour, and was then extracted with two 100 ml.-portions of distilled water, with two 70 ml.-portions of a 1.25 N aqueous solution of sodium hydroxide, and then with two additional 70 ml.-portions of distilled water. The pH of the last-washed liquid was approximately 6.

The benzene-ethereal layer was dried, and the solvents evaporated therefrom in vacuo. The residual material was recrystallized, first from acetone, and then from methanol to give impure $\Delta^{8,22}$-3-acetoxy-11-keto-ergostadiene; M. P. 126–129° C. This material was again recrystallized from methanol to give substantially pure $\Delta^{8,22}$-3-acetoxy-11-keto-ergostadiene; M. P. 131–132° C.

Example 3

Four and twelve-hundreths grams of ergosterol-D-epoxide were dissolved in 100 ml. of benzene and the solution was added to a cold solution of 2.66 g. of anhydrous aluminum chloride in 50 ml. of absolute ether. The mixture was allowed to stand in an ice bath for five hours and the reaction solution was washed successively with dilute aqueous sodium acetate solution and with saturated aqueous sodium chloride solution. The benzene-ethereal solution was dried over magnesium sulfate, and the solvents were evaporated in vacuo. The residual material was dissolved in hot methanol, and upon cooling the solution, needle-like crystals separated which were recovered by filtration and dried to give material melting at 141–155° C. This material was a by-product.

The mother liquor was evaporated in vacuo to small volume and the soft needle-like crystals which separated were recovered by filtration and dried to give material melting at 147–157° C. This product was recrystallized twice from methanol to give substantially pure $\Delta^{8(9),22}$-3-hydroxy-11-keto-ergostadiene; M. P. 166–167° C.; ultra violet absorption spectra $\lambda$ max. 2550; E%=199, $[\alpha]^{24°}=+128°$ (CHCl$_3$).

Example 4

Five and five-tenths grams of antimony trichloride, dried by azeotropic distillation of a benzene solution thereof, were dissolved in 75 ml. of dry benzene. Four and fifty-five hundreths grams of ergosterol-D-acetate epoxide were dissolved 100 ml. of dry benzene, and the solution was added to the antimony trichloride solution. The resulting mixture was allowed to stand at room temperature for a period of about six days. The benzene reaction solution was then washed thoroughly with water and dried over anhydrous magnesium sulfate. The benzene was evaporated in vacuo from the dry benzene solution, and the residual brown solid was dissolved in 300 ml. of hot methanol. The methanol solution was cooled and allowed to stand overnight, and the crystalline material which precipitated was separated by filtration and identified as $\alpha$-dihydro-ergosterolacetate.

The methanolic mother liquor was evaporated to a volume of 75 ml. and the needle-like crystals which separated were recovered by filtration and dried to give material melting at 126–129° C. This product was recrystallized twice from methanol to give substantially pure $\Delta^{8(9),22}$ - 3 - acetoxy - 11 - keto - ergostadiene; M. P. 132–134° C.

Example 5

Twenty grams of ergosterol-D-acetate-epoxide were dissolved in 500 ml. of benzene. To this solution was added a solution of anhydrous stannic chloride (20 ml.) in 100 ml. of absolute ether. The mixture was allowed to stand at room temperature for a period of about seven days. The reaction solution was washed thoroughly with water, with one molar aqueous sodium carbonate solution, and with water. The solvents were evaporated in vacuo to give a yellow product ($\lambda$ max.=2540; E%=132). Fractional crystallization of this material from methanol gave substantially pure $\Delta^{8(9),22}$ - 3 - acetoxy - 11 - keto-ergostadiene; M. P. 131–133° C.

Example 6

Four and five-tenths grams of ergosteryl-D-epoxide were added to a saturated solution of 15 g. of bismuth trichloride in 200 ml. of absolute ether. After addition of the ergosteryl-D-acetate epoxide, the solution developed a green color. The mixture was allowed to stand at room temperature for a period of about three days. A 50 ml. sample of the ethereal reaction solution was withdrawn, and washed thoroughly with water, and dried. The ethereal solution was then evaporated to give a light yellow product; M. P. 120–124°; $\lambda$ max.=2540; E%=164. This material was recrystallized twice from methanol to give substantially pure $\Delta^{8(9),22}$ - 3 - acetoxy - 11 - keto - ergostadiene; M. P. 131–134° C.

Example 7

Two grams of 3 - acetoxy - 7,9(11) - dehydrotigogenin epoxide was dissolved in 35 cc. of benzene and 2 cc. of 45% boron trifluoride-ether. The brown, green-fluorescing solution deposited a deep brown gum after forty-eight hours at room temperature. The benzene solution was washed successively with 50 cc. of water, 50 cc. of 10% sodium carbonate solution, 50 cc. of water and then concentrated in vacuo. After trituration with methanol the semi-crystalline residue of substantially pure $\Delta^{8(9)}$-3-acetoxy-11-keto-tigogenin was collected. Further purification by chromatography over alumina and subsequent recrystallization from ethanol resulted in the preparation of a pure sample; M. P. 238° C. $\lambda$ max. 2550 (ethanol); $E_1\%$ cm.$^{191}$.

Example 8

Four and five-tenths grams of ergosterol - D - acetate-epoxide were added to a saturated solution of 12 g. of freshly fused ferric chloride hexahydrate in 100 ml. of absolute ether. The mixture was allowed to stand at room temperature for a period of about three days. A 25 ml. sample of the ethereal reaction solution was withdrawn, washed with water, and dried. The ethereal solution was then evaporated to give a white product; M. P. 124–133° C.; $\gamma$ max.=2530, E%=103. This material was recrystallized twice from methanol to give substantially pure $\Delta^{8(9),22}$-3-acetoxy-11-keto-ergostadiene; M. P. 134–137° C.

Example 9

Eight and five-tenths grams of anhydrous cupric chloride were partially dissolved in 100 ml. of absolute ether. To this solution was added a solution of 4.55 g. of ergosterol-D-acetate epoxide in 75 ml. of anhydrous benzene. The mixture was allowed to stand at room temperature for a period of about eighteen days. The brown-colored benzene-ether reaction solution was washed thoroughly with water, and dried over magnesium sulfate. The dried benzene-ether solution was then evaporated in vacuo to give a light brown-colored product; max.=2540, E%=135. This material was fractionally recrystallized from methanol to give substantially pure $\Delta^{8(9),22}$-3-acetoxy-11-keto-ergostadiene; M. P. 132–134° C.

Various changes and modifications may be made in carrying out the present invention without departing from the spirit and scope thereof. Insofar as these changes and modifications are within the purview of the annexed claims, they are to be considered as part of my invention.

I claim:

1. The process which comprises reacting, under substantially anhydrous conditions, an epoxide of a $\Delta^{7(8),9(11)}$-cyclopentanopolyhydrophenanthrene compound, selected from the group which consists of $\Delta^{7,9(11)}$-steroid epoxides of the following series: the ergosterol series and the sapogenin series, with a polyvalent metal halide, whose halogen component has an atomic number below 40 and which can be characterized as a "Lewis acid," thereby producing the corresponding $\Delta^{8(9)}$-11-keto-cyclopentanopolyhydrophenanthrene compound.

2. The process which comprises reacting, under substantially anhydrous conditions, the epoxide of ergosteryl-D-acetate with a polyvalent metal halide, whose halogen component has an atomic number below 40 and which can be characterized as a "Lewis acid," thereby producing $\Delta^{8(9),22}$-3-acetoxy-11-keto-ergostadiene.

3. The process which comprises reacting, under substantially anhydrous conditions, the epoxide of $\Delta^{7(8),9(11),22}$-3-hydroxy-ergostatriene with a polyvalent metal halide, whose halogen component has an atomic number below 40 and which can be characterized as a "Lewis acid," thereby producing $\Delta^{8(9),22}$-3-hydroxy-11-keto-ergostadiene.

4. The process which comprises reacting, under substantially anhydrous conditions, the epoxide of $\Delta^{7,9(11)}$-bisdehydrotigogenin with a polyvalent metal halide, whose halogen component has an atomic number below 40 and which can be characterized as a "Lewis acid," thereby producing $\Delta^{8(9)}$-11-keto-dehydrotigogenin.

5. The process which comprises reacting an epoxide of a $\Delta^{7(8),9(11)}$-cyclopentanopolyhydrophenanthrene compound, selected from the group which consists of $\Delta^{7,9(11)}$-steroid epoxides of the following series: the ergosterol series and the sapogenin series, with a polyvalent metal halide, whose halogen component has an atomic number below 40 and which can be characterized as a "Lewis acid," said reaction being carried out by bringing the reactants together in a substantially anhydrous liquid medium comprising a lower dialkyl ether, thereby producing the corresponding $\Delta^{8(9)}$-11-keto-cyclopentanopolyhydrophenanthrene compound.

6. The process which comprises reacting an epoxide of a $\Delta^{7(8),9(11)}$-cyclopentanopolyhydrophenanthrene compound, selected from the group which consists of $\Delta^{7,9(11)}$-steroid epoxides of the following series: the ergosterol series and the sapogenin series, with a polyvalent metal halide, whose halogen component has an atomic number below 40 and which can be characterized as a "Lewis acid," said reaction being carried out by bringing the reactants together in a substantially anhydrous liquid medium comprising an aromatic hydrocarbon solvent, thereby producing the corresponding $\Delta^{8(9)}$-11-keto-cyclopentanopolyhydrophenanthrene compound.

7. The process which comprises reacting an epoxide of a $\Delta^{7(8),9(11)}$-cyclopentanopolyhydrophenanthrene compound, selected from the group which consists of $\Delta^{7,9(11)}$-steroid epoxides of the following series: the ergosterol series and the sapogenin series, with boron trihalide under substantially anhydrous conditions thereby producing the corresponding $\Delta^{8(9)}$-11-keto - cyclopentanopolyhydrophenanthrene compound.

8. The process which comprises reacting an epoxide of a $\Delta^{7(8),9(11)}$-cyclopentanopolyhydrophenanthrene compound, selected from the group which consists of $\Delta^{7,9(11)}$-steroid epoxides of the following series: the ergosterol series and the sapogenin series, with boron trifluoride under substantially anhydrous conditions thereby producing the corresponding $\Delta^{8(9)}$-11-keto-cyclopentanopolyhydrophenanthrene compound.

9. The process which comprises reacting an epoxide of a $\Delta^{7(8),9(11)}$-cyclopentanopolyhydrophenanthrene compound, selected from the group which consists of $\Delta^{7,9(11)}$-steroid epoxides of the following series: the ergosterol series and the sapogenin series, with aluminum chloride under substantially anhydrous conditions thereby producing the corresponding $\Delta^{8(9)}$-11-keto-cyclopentanopolyhydrophenanthrene compound.

10. The process which comprises reacting an epoxide of a $\Delta^{7(8),9(11)}$-cyclopentanopolyhydrophenanthrene compound, selected from the group which consists of $\Delta^{7,9(11)}$-steroid epoxides of the following series: the ergosterol series and the sapogenin series, with ferric chloride under substantially anhydrous conditions thereby producing the corresponding $\Delta^{8(9)}$-11-keto - cyclopentanopolyhydrophenanthrene compound.

11. The process which comprises reacting ergosteryl D-acetate epoxide with boron trifluoride-diethyl ether complex, said reaction being carried out by bringing the reactants together in a medium comprising benzene, thereby producing $\Delta^{8(9),22}$-3-acetoxy-11-keto-ergostadiene.

12. The process which comprises reacting the epoxide of $\Delta^{7(8),9(11),22}$-3-hydroxy-ergostatriene with boron trifluoride-diethyl ether complex thereby producing $\Delta^{8(9),22}$-3-hydroxy-11-keto-ergostadiene.

13. The process which comprises reacting the epoxide of $\Delta^{7(8),9(11),22}$-3-hydroxy-ergostatriene with aluminum chloride thereby producing $\Delta^{8(9),22}$-3-hydroxy-11-keto ergostadiene.

14. The process which comprises reacting the epoxide of $\Delta^{7,9(11)}$-bisdehydrotigogenin with boron trifluoride-diethyl ether complex thereby producing $\Delta^{8(9)}$-11-keto-dehydrotigogenin.

15. A $\Delta^{8(9)}$ - 11 - keto - steroid having the following formula:

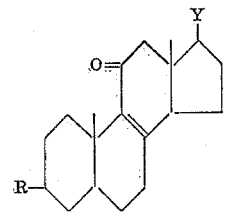

wherein R is a radical selected from the group which consists of hydroxy and lower alkanoyloxy radicals, and Y is a C–17 side chain selected from the group which consists of the ergosterol side chain and the sapogenin side chain.

16. $\Delta^{8(9),22}$-3-acetoxy-11-keto-ergostadiene.

17. $\Delta^{8(9),22}$-3-hydroxy-11-keto-ergostadiene.

18. $\Delta^{8(9)}$-11-keto-dehydrotigogenin.

19. 3-acetoxy-11-keto-8(9),22-ergostadiene.

(References on following page)

References Cited in the file of this patent

UNITED STATES PATENTS 2,645,666    Hogg _____ July 14, 1953

OTHER REFERENCES

Elsevier's Encyclopedia of Organic Chemistry, series III, vol. 14, second supplement, pp. 1266s–1268s, 1277s–1278s and 1300s (1952).

Fieser et al.: Nat. Products Related to Phenanthrene, 3rd ed., page 425 (1949).

Doree: Jour. Chem. Soc., 1948, 988–990.

Ruzicka: Helv. Chim. Acta 27, 472–489 (1944).

Heusser: Helv. Chim. Acta 34, 2106–2132 (August 1951).